June 9, 1964 C. E. VALCHAR ETAL 3,136,618

METHOD OF BENDING GLASS SHEETS

Filed Aug. 8, 1961

INVENTORS
CLEMENT E. VALCHAR
JOSEPH A. NOCA and
BY STANLEY J. MROZINSKI

Oscar H. Spencer
ATTORNEY 3,136,618
METHOD OF BENDING GLASS SHEETS
Clement Edward Valchar, Tarentum, Joseph A. Noca, Irwin, and Stanley J. Mrozinski, Natrona, Pa., assignors to Pittsburgh Plate Glass Company, Pittsburgh, Pa., a corporation of Pennsylvania
Filed Aug. 8, 1961, Ser. No. 136,968
6 Claims. (Cl. 65—106)

The present invention relates to treating glass and particularly refers to improvements in shaping glass sheets wherein a heat-softened glass sheet is supported in spaced relation between two complementary forming members and is shaped by being sandwiched between said forming members while in a plastic condition.

Flat glass sheets are shaped successively by heat-softening followed by sandwiching the major surfaces of each heat-softened glass sheet between a pair of glass forming members having complementary convex and concave shaping surfaces opposing one another. During such an operation, the glass sheets are gripped near their upper edges by tongs. The latter are suspended from carriages which are conveyed along a horizontal path of a conveyor along a horizontal path of conveyor that extends through a furnace and a glass forming station.

During the heating that softens the glass before it is shaped, the tongs provide a pair of gripping forces opposing one another through the thickness of the glass sheet. Each glass sheet is suspended in a vertical plane from the tongs. Normally more than one set of tongs is needed to support a flat glass sheet.

One reason for requiring more than one set of tongs is that the movement of the heat-softened glass sheet into and out of the glass forming station is intermittent. The glass is accelerated from the heating furnace to the forming station. It is stopped altogether while the forming members move toward one another against the opposite surfaces of the heat-softened sheet. Then the glass is moved rapidly from the forming station into a quenching station where streams of cool air are dispensed under pressure against the opposite major surfaces of the now shaped glass sheet. Thus a tendency exists for the glass sheet to pivot about an axis extending through its thickness evey time the glass sheet is suddenly accelerated or decelerated along its path of movement. Suspending the glass from at least two sets of tongs reduces this tendency for the glass sheet to pivot.

It also has been found necessary to hang glass sheets of a size now required to be fabricated to satisfy customer demands from at least two sets of tongs because a single set of tongs applies a gripping force of sufficient magnitude to cause severe penetration into the softened glass sheet surfaces while suspending the weight of the entire glass sheet therefrom.

Many devices have been developed to insure that flat glass sheets are properly suspended initially from a plurality of sets of tongs. Proper loading reduces the likelihood that each set of tongs will apply a twisting force that distorts the glass and imposes a defect known as a kink therein. When glass is loaded properly, the gripping force applied thereto by each set of tongs is substantially equal to that applied by each other set of tongs.

Each pair of tongs exerts a pull in a substantially vertical direction at each glass gripping region gripped by a pair of tongs. When the glass sheet is heat-softened, its low viscosity at elevated temperatures permits the glass to distort in the vicinity of each gripping region and form a convex bump in the upper edge of the supported glass sheet. The effect of this pulling is minimized when the proportion of the glass weight borne by each pair of tongs is minimized.

An optimum condition is obtained when the number of tongs used is increased and an equal portion of the glass weight is borne by each pair of tongs. However, the complexity of loading a glass sheet increases with the number of pairs of tongs used. Therefore, a compromise is usually made to limit the number of pairs of tongs used to the minimum needed to support the glass sheet and obtain an upper edge distortion within acceptable tolerance.

When the prior art techniques for gripping a flat glass sheet by a plurality of tongs are employed for tempering flat glass sheets, the defects due to kinking and pulling are reduced substantially. However, when the flat glass sheets are shaped into curved configurations, the prior art criteria for suspending flat glass sheets properly are insufficient to avoid this defect.

When glass sheets are formed into a curved shape about a horizontally disposed axis of curvature according to the methods of the prior art, the glass is simultaneously contacted at one surface by a convex forming member and at its other surface by the upper and lower extremities of a concave forming member. The outermost portion of the convex forming member contacts the glass sheet intermediate upper and lower lines of contact of the concave shaping surface of the concave forming member on the other surface of the glass sheet.

As the forming members continue to move simultaneously toward one another after having made initial contact with the opposite surfaces of the glass sheet, the upper and lower edges of the glass sheet are displaced to one side of the original vertical plane of support for the flat glass sheet while the central portion of the glass sheet is displaced to the opposite side of said vertical plane. This simultaneous movement causes the forming members to apply a gripping force on the glass sheet that exceeds that of the tongs. Hence, the glass is pulled, distorted, marred, and sometimes even removed completely out of gripping relation with the tongs during the time the convex and concave forming members sandwich the curved glass sheet therebetween. This prior art technique has been found to be a substantial cause for losses during production runs.

The present invention suggests avoiding the defects of the prior art production methods by employing a novel technique for moving the forming members in a prearranged sequence of motions. When the tongs supported glass sheet is suspended between the opposing substantially complementary glass forming members, they are initially moved toward the opposite surfaces of the glass sheet. However, the convex forming member contacts one surface of the tongs suspended glass sheet and tilts the glass sheet toward the concave glass forming member. As the convex glass forming member tilts the glass sheet, it also applies an upward component of thrust that helps support the weight of the glass sheet. The angle of tilting is dependent upon the shape to which the glass sheet is to be formed.

After the convex member has contacted and tilted the glass sheet through the desired angle, its motion is stopped and the concave glass forming member continues its motion toward the opposite surface of the glass sheet, initially making contact at the lowermost portion of the glass sheet to begin to shape the lower portion of the glass sheet toward the lower portion of the convex glass forming member and to impart a slight upward movement to the glass sheet to compensate for the shortening of its vertical dimension somewhat and to relieve some of the force tending to remove the glass from gripping engagement by the tongs. As the heat-softened glass sheet is shaped, it remains in contact with the convex shaping member. In fact, the area of contact between the convex glass forming member and the surface of the glass which faces the latter increases. In addition, the upper edge portion of the concave glass forming member makes contact with the upper portion of the tilted glass sheet and the area of contact between the surface of the glass sheet which faces the concave glass forming member and its concave shaping surface increases until the glass sheet is securely sandwiched in pressurized relation between the opposing glass forming members.

The factors of the present invention that are believed to provide improved results compared to those resulting from using prior art techniques are believed to be (1) the vertical component of support provided by the convex forming member for a portion of the weight of the tongs supported glass sheet during the time that the concave forming member is moving into pressurized relation with the heat-softened glass sheet and the convex forming member and (2) the tendency of the lower portion of the concave forming member to urge the glass sheet upward from the instant of its initial contact with the lower edge of the glass sheet until the glass sheet is securely sandwiched between the opposing glass forming members to compensate for the shortening of its vertical dimension as the glass bends about a horizontal axis. Thus, when the substantially complementary glass forming members apply a gripping force onto the tongs supported glass sheet, the initial vertical component of support provided by the convex forming member and the upward lifting caused by the inward movement of the concave forming member makes it unlikely that the gripping force between the glass forming members will pull the glass out of the grip furnished by the tongs. Instead, the relaxed tongs become tensioned again. Therefore, the technique suggested by the present invention lessens the incidence of production losses compared to those experienced by glass forming techniques involving the simultaneous movement of the glass forming members toward one another.

Other factors which may be incorporated in the present method of operation to further minimize production losses include the employment of freely rotatable elements as the glass gripping elements of tongs instead of tong points as described and claimed in application Serial No. 46,306 of William J. Hay, filed July 29, 1960, for "Supporting Glass Sheets," providing oblique upward movement for the glass forming members instead of opposing horizontal movement as described and claimed in application Serial No. 113,853 of Dean L. Thomas for "Shaping Glass," filed May 31, 1961, and tilting the shaping surfaces of each glass forming member relative to its axis of movement so that the portion of each complementary shaping surface that is tangent to a vertical plane lies toward the upper edge of the shaping surface, either as depicted in the latter patent application or somewhere intermediate the upper edge and the center of the forming member, particularly when the bending curve about a horizontal axis has a non-uniform radius of curvature.

Accordingly it is an object of the present invention to minimize losses in producing bent glass sheets by press bending, particularly upper edge distortion and vents due to pulling forces between the glass gripping tongs and the glass forming members along a direction parallel to the major glass sheet surfaces and to minimize kinks in press shaped glass sheets due to twisting forces applied by the glass gripping tongs on localized regions of the glass sheets.

The above and other objects will be understood better after the reader has studied a description of a typical illustrative embodiment of the invention which follows.

In the drawings which form part of the description of the illustrative embodiment and wherein like reference numerals are applied to like structural elements, FIG. 1 is a fragmentary longitudinal view of a typical furnace and glass forming station in which the present invention may be employed successfully;

Figure 3:
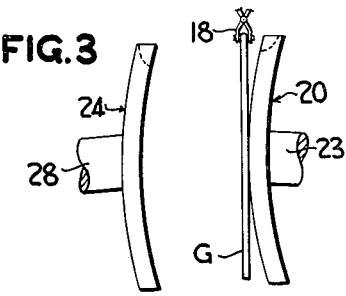
FIG. 3 is a fragmentary view similar to that shown in FIG. 2 showing the relative position of the glass forming members to the glass at the moment the convex forming member has moved into contact with one surface of the glass sheet while the concave forming member is out of contact with the glass sheet.
Figure 4:
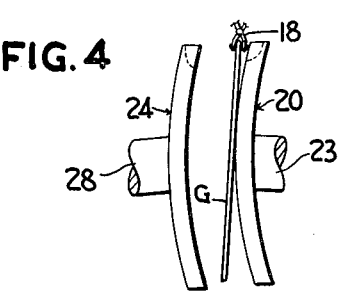
FIG. 4 is a fragmentary view similar to those shown in FIGS. 2 and 3 showing how the convex glass forming member tilts the glass sheet while the concave glass forming member is still spaced from the glass sheet.
Figure 6:
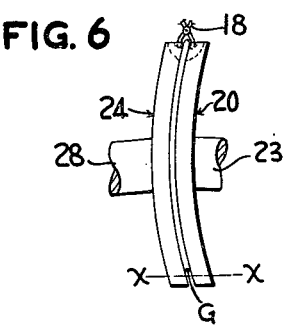
Figure 5:
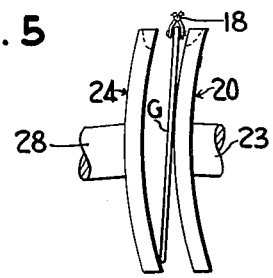

FIG. 5 is a fragmentary view similar to FIG. 4 showing how the concave glass forming member makes initial contact with the bottom portion of the glass sheet supported in tilted suspended relation by the combined efforts of the tongs and the convex glass forming member; and FIG. 6 is a fragmentary view similar to that of FIGS. 3 to 5 showing the glass forming members in their closed position sandwiching the bent glass sheet therebetween and showing in phantom the initial plane of contact by the bottom edge of the glass sheet with the concave forming member.

Figure 1:
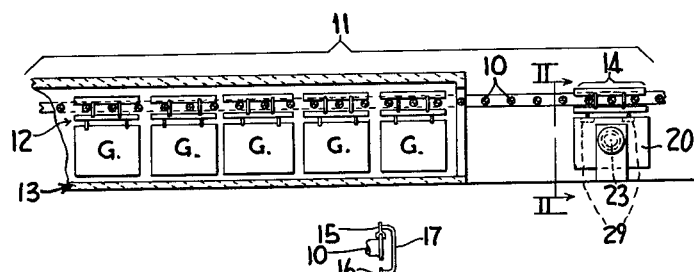
Figure 2:
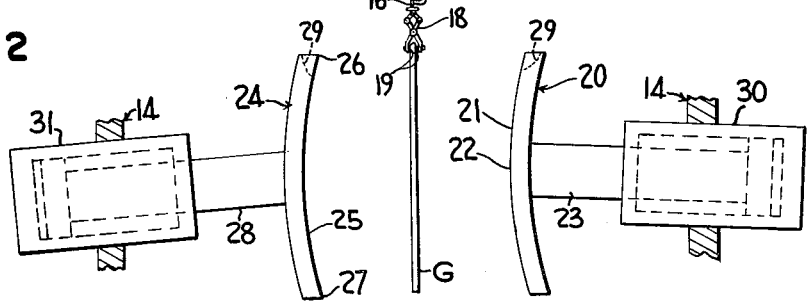
FIG. 2 is a fragmentary transverse view of a glass forming station taken along the lines II—II of FIG. 1, showing two substantially complementary glass forming members in retracted position preparatory to move toward one another in the manner taught by the present invention and showing a glass sheet supported in spaced relation between the two complementary glass forming members.

Referring to the drawings, reference number 10 refers to the driving rolls of a carriage conveyor 11 for moving carriages 12 along a horizontal path through the upper portion of a tunnel-like furnace 13 and a glass forming station 14. Each carriage 12 is composed of a cast iron alloy and comprises an upper beam 15 that rides on rolls 10 and a lower beam 16 interconnected to the upper beam 15 by a pair of arcuately shaped vertically extending connecting rods 17 (FIG. 2). The lower beam 16 of each carriage 12 has suspended therefrom a pair of steel alloy glass gripping tongs 18 which grip a supported glass sheet G at two spaced regions along its upper edge.

Each pair of tongs 18 has a pair of glass gripping elements 19 that apply opposing forces through the glass thickness to hang the glass sheet therefrom in a vertical plane. Preferably the glass gripping elements 19 are freely rotatable discs or disc-like members gripping a portion of the glass sheet adjacent its top edge. The discs or disc-like members which serve as glass gripping elements 19 are freely rotatable about axes extending vertically.

Referring to FIG. 2, the glass forming station 14 comprises a convex glass forming member 20 having a convex shaping surface 21, whose outermost portion is indicated by reference numeral 22. An actuating piston 23 is mounted to the rear of convex glass forming member 20 to urge the latter to move along the axis defined by the length of the piston forward and away from the vertical plane occupied by the glass sheets G in succession at the forming station 14.

At the other side of the vertical plane occupied by the glass sheets, the glass forming station 14 comprises a concave glass forming member 24 having a concave shaping surface 25 which conforms to and is substantially complementary to the convex shaping surface 21 of convex glass forming member 20. The difference in shape between shaping surfaces 21 and 25 permits the insertion of a glass sheet of finite thickness therebetween.

Reference number 26 refers to the upper edge of the concave shaping surface 25, whereas reference number 27 refers to the lower edge of the concave shaping surface 25. An actuating piston 28 is mounted to the rear of concave glass forming member 24 to urge the latter to move along the axis defined by the length of the plunger of piston 28.

Glass forming members 20 and 24 are composed of a heat resistant material such as stainless steel provided with a covering of fiber glass or asbestos or the like at their shaping surfaces. When they are in mating engagement with one another and sandwiching a glass sheet G therebetween, clearance must be provided for the tongs 18. These clearances or notched out portions are depicted by reference characters 29.

Pistons 23 and 28 are movably mounted in piston cylinders 30 and 31, respectively, to urge the glass forrming members 20 and 24 toward and away from mating engagement with one another. Piston cylinders 30 and 31 are rigidly attached to the structural support for the glass forming station 14.

In the past actuating pistons 23 and 28 have been mounted for equal, simultaneous movement toward and away from one another. The improvement provided by the present invention involves controlling the movement of the actuating pistons 23 and 28 so that the convex glass forming member 20 and the concave glass forming member 24 to which actuating pistons 23 and 28 are operatively connected, respectively, move in a controlled sequence of operations.

According to the specific illustrative embodiment of the present invention described herein, the movement of the convex glass forming member 20 and that of the concave glass forming member 24 is so controlled that the convex shaping surface 21 of the convex glass forming member 20 initially contacts the major surface of the glass sheet G facing the right of FIGS. 2 to 6 and continues to move to the limit of its innermost movement. The convex member moves slightly beyond the plane occupied by the tongs suspended glass sheet, thus tilting the glass sheet and providing a vertical component of force to support a portion of the weight of the tongs suspended glass sheet before the concave shaping surface 25 of forming member 24 makes initial contact with the glass sheet near its bottom edge 27.

The angle of tilting should be a small acute angle not exceeding 30 degrees. If the glass is tilted through a larger angle, the gravitational force on the tongs tending to return the tongs to a vertical disposition tends to dimple the glass at the regions gripped by the tongs.

The concave glass forming member 24 continues to move toward a mating position with convex glass forming member 20 until the glass forming members 20 and 24 are in alignment with one another and in pressurized contact with the opposite surfaces of the glass sheet. The first portion of concave forming member 24 to contact the glass sheet G is in plane x—x (FIG. 6) which lies below the outermost portion 22 of the convex shaping surface 21 of covex forming member 20. Inward movement of the concave member 24 lifts the entire glass sheet a distance sufficient to compensate for the shortening of the glass sheet's vertical dimension on bending without substantially affecting the upward component of force of the convex forming member 20 on the glass sheet because the inward movement of concave forming member immediately after its initial contact with the bottom edge of the glass sheet tends to relieve somewhat the gripping force of the tong gripping members 19 on the upper edge portion of the glass sheet.

As the movement of the concave member 20 is concluded, the upper portion of the glass sheet is shaped as it is sandwiched between the upper portions of the forming members 20 and 24. This shaping shortens the vertical dimension of the glass sheet between its upper edge and its portion initially contacted by the outermost portion 22 somewhat, but this shortening is compensated by the responsive rotation of tongs 18 from a tilted to a vertical orientation.

The actuating pistons then retract both glass forming members to permit the shaped glass sheet to move rapidly from the glass forming station 14 to a glass quenching station (not shown) and prepare the glass forming station for receipt of the next glass sheet to be formed by press bending.

Many devices may be used to control the sequence of operation of the glass forming members described hereinabove. For example, timing circuits may be interconnected to one another and to the actuating pistons 23 and 28 in such a manner as to provide the necessary sequence of operation. However, a simple apparatus comprises a relatively long piston cylinder 31 for actuating piston 28 which controls the position of the concave glass forming member 24 and a relatively short piston cylinder 30 for actuating piston 23 which controls the location of the convex glass forming member 20. By having both pistons of equal cross-sectional areas, and by locating the piston cylinders in such locations that the inner most position of movement permitted by piston cylinder 30 for actuating piston 23 is in the position shown in FIG. 4 and the innermost position of movement piston cylinder 31 permits for actuating piston 28 is in the position depicted in FIG. 6 and by having a common hydraulic supply for actuating the pistons, pistons 23 and 28 are moved inward at equal rates. However, because of the relative location and size of piston cylinders 30 and 31, the concave glass forming member 24 is permitted to move inward after the convex glass forming member 20 has come to rest.

Another technique employed successfully is to employ adjustable hydraulic check means for controlling the relative rates of movement for the pistons within piston cylinders of equal length to enable piston 23 to move convex glass forming member 20 relatively rapidly toward its innermost position, while piston 28 moves concave glass forming member 24 more slowly toward its innermost position. Typical adjustable hydraulic check means is shown in Belgian Patent No. 585,647. Other modifications and combinations of the above and their equivalent structures will become obvious in the light of the various suggestions made above. Also, high temperature springs may be used to retract the pistons between glass forming operations.

In order to provide a complete disclosure, a typical commercial operation will be described in the following paragraph.

*Example I*

The following details are supplied of a typical operation to produce curved side lights of tempered glass of nominal thickness of ⅛ inch having dimensions of approximately 8½ inches high and 12½ inches wide bent to a 16 inch radius of curvature about an axis extending horizontally. The glass sheets were heated gradually for a period of about 4 minutes to a surface temperature of about 1225° F. During this heating phase the sheets were conveyed through a tunnel-like furnace at a constant speed. When the immediately preceding glass sheet had been shaped and the glass forming members were being separated, the furnace exit door opened and the next sheet moved to the glass forming station. About 4 seconds elapsed in moving the sheet to its proper position at the glass forming station.

The convex glass forming member contacted one surface of the tong suspended glass sheet and moved about ¾ inch past the initial line of contact. This tilted the glass at an angle of about 10 degrees with respect to the vertical plane in which it was originally suspended. The concave forming member moved inward toward the opposite surface of the glass sheet making contact initially with the bottom edge and subsequently with the top edge. It took about 2 seconds for the glass shaping members to close and impress their shapes onto the opposite surfaces of the heat-softened glass sheet.

The glass shaping members were held in pressurized contact of about 1 pound per square inch against the opposite surfaces of the glass sheet for about 2 seconds and then were retracted to permit the shaped glass sheet to move toward the quenching station and to provide clearance to receive the immediately subsequent glass sheet therebetween for the next glass forming operation.

Losses of glass sheets due to kinking and/or distortion during the glass forming operation described above were less than 1 percent of those pressed. By contrast, over 30 percent loss of these types was experienced in press bending glass sheets of the same pattern using simultaneous movement of the glass forming members toward each other to sandwich the glass sheets.

In order to insure that the glass forming members move toward one another rapidly and then are hydraulically checked toward the end of their inward movement so as to avoid chattering and other vibrations in the glass, hydraulic check means such as disclosed in Belgian Patent No. 585,647 may be incorporated.

It is understood that the principles described above must be followed in modified form as the depth and complexity of bend varies, but that they are needed to produce either simple bends in which the glass is bent about a horizontal axis of bending or a compound bend wherein the glass is bent about more than one axis of bending including one having a horizontal component.

A description of an illustrative embodiment of the present invention has been made for the purpose of illustration and many equivalent methods of operation will become obvious in the light of the present disclosure. For example, the glass sheet may be supported by supporting elements other than tongs during the press bending operation, such as on wires or refractory blocks that support the glass sheet along its bottom edge. Reference to the scope of the present invention may be obtained from the claimed subject matter which follows.

What is claimed is:

1. In the art of press bending glass sheets wherein a heat-softened glass sheet is suspended by tongs which grip said glass sheet adjacent its top edge in a substantially vertical plane in spaced relation between two substantially complementary glass forming members of convex and concave configuration, respectively, so that one glass sheet surface faces said forming member of concave configuration and the other glass sheet surface faces said forming member of convex configuration and the glass sheet is shaped by being sandwiched between said two substantially complementary forming members, the improvement comprising tilting the supported glass sheet toward the concave forming member by contacting a first surface of said glass sheet with said convex forming member to reduce the distance between the convex forming member and the portion of the glass sheet gripped by said tongs while the concave forming member is spaced from the opposite surface of the glass sheet, and subsequently moving the concave forming member toward a mating position with said convex forming member while maintaining the first surface of said glass sheet in contact with said convex forming member until the glass sheet is sandwiched between said concave and convex forming members and said concave and convex forming members are in alignment with one another and in contact with the opposite surfaces of the supported glass sheet.

2. The improvement according to claim 1, wherein the angle of tilting is a small acute angle not exceeding 30 degrees.

3. The improvement according to claim 1, wherein said concave shaping surface of said concave forming member first contacts said opposite surface of said glass sheet at its bottom edge.

4. The improvement according to claim 2, wherein said concave forming member is moved in an obliquely upward direction toward said convex forming member.

5. The improvement according to claim 1, wherein the angle of tilting is about 10 degrees.

6. In the art of press bending glass sheets wherein a heat-softened glass sheet is suspended by tongs which grip said glass sheet adjacent its top edge in a substantially vertical plane in spaced relation between two substantially complementary glass forming members of convex and concave configuration, respectively, so that one glass sheet surface faces one of said forming members and the other glass sheet surface faces said other forming member and the glass sheet is shaped by being sandwiched between said forming members, the improvement comprising tilting said heat-softened glass sheet toward one of said glass forming members by contacting one surface of said glass sheet with one of said forming members while the other of said forming members is out of contact with said glass sheet to reduce the distance between the tong gripped portion and said one of said forming members, and subsequently moving the other forming member toward a mating position with said one forming member while maintaining the first surface of said glass sheet in contact with said one forming member until the glass sheet is sandwiched between said one and said other forming members and said forming members are in alignment with one another and in contact with the opposite surfaces of the suspended glass sheet.

References Cited in the file of this patent
UNITED STATES PATENTS

| | | |
|---|---|---|
| 2,263,005 | McClure | Nov. 18, 1941 |
| 2,530,043 | Borkland | Nov. 14, 1950 |